United States Patent [19]

Shipman et al.

[11] 4,307,160
[45] Dec. 22, 1981

[54] LITHIUM-THIONYL CHLORIDE BATTERY WITH NIOBIUM PENTACHLORIDE ELECTROLYTE

[75] Inventors: William H. Shipman, La Mesa; Joseph F. McCartney, Solana Beach, both of Calif.

[73] Assignee: The United States of America as represented by the Secretary of the Navy, Washington, D.C.

[21] Appl. No.: 217,269

[22] Filed: Dec. 17, 1980

[51] Int. Cl.³ .............................................. H01M 4/36
[52] U.S. Cl. .................................... 429/105; 429/196
[58] Field of Search ............... 429/105, 101, 196, 199

[56] References Cited

U.S. PATENT DOCUMENTS 4,012,564  3/1977  Auboin ........................... 429/196 X
4,150,198  4/1979  Domeniconi et al. .......... 429/196 X Primary Examiner—Charles F. LeFevour
Attorney, Agent, or Firm—R. S. Sciascia; Ervin F. Johnston

[57] ABSTRACT

A lithium, thionyl chloride battery is provided with an electrolyte which makes it safe under a reverse voltage condition. The electrolyte is niobium pentachloride which is dissolved in the thionyl chloride.

6 Claims, 2 Drawing Figures

LITHIUM-THIONYL CHLORIDE BATTERY WITH NIOBIUM PENTACHLORIDE ELECTROLYTE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The lithium, thionyl chloride battery is one of the most powerful batteries known. The power of the lithium, thionyl chloride battery is in the order of 25 times as much as the common lead acid type battery. The lithium, thionyl chloride battery is desired for many low rate applications such as heart pacemakers, fire alarms, watches, and calculators. The U.S. Navy has been experimenting with lithium, thionyl chloride batteries for higher rate applications, such as powering torpedoes. In order to power a torpedo a number of the lithium, thionyl chloride batteries are connected in series. A serious drawback to the lithium, thionyl chloride battery is its potential for exploding like an incendiary bomb when shorted out or subjected to a reverse voltage. In a reverse voltage condition the lithium in the battery tends to electroplate a very thin wirelike structure or dendrite between the anode of lithium and cathode current collector. In the reverse voltage condition the dendrite will flash or burn up and, if there is the presence of elemental sulfur, the incendiary type explosion takes place. Much effort has been expended by many researchers to resolve this explosion problem of the lithium, thionyl chloride battery.

A situation where the lithium, thionyl chloride battery is particularly susceptible to explosion is where it is connected in series with a number of other lithium, thionyl chloride batteries. If one of these batteries in the battery string is of less capacity, weaker, or partially used after originally being of the same strength as the other batteries, a reverse voltage condition will ensue when the battery has reached the end of its capacity. This depleted battery in the string of batteries will then undergo a reverse voltage condition and will be immediately susceptible to violent explosion due to the growth of lithium dendrites. The hoped for situation is that only batteries of the same capacity are connected in series. However, because of human error it is possible that one of the batteries in a string of batteries is of a lesser capacity than the other batteries in the string. It is this dangerous situation which is overcome by the present invention.

SUMMARY OF THE INVENTION

The present invention has met the long sought desire of providing a safe lithium, thionyl chloride battery. This has been accomplished by utilizing an electrolyte of niobium pentachloride which is dissolved in the thionyl chloride of the battery. With this arrangement the niobium pentachloride acts as an electron sink to soak up the excess electrons when the battery undergoes a reverse voltage condition. This prevents the lithium from forming dendrites and flashing under reverse voltage to cause an incendiary type explosion in the presence of elemental sulfur. It is preferred that a 0.9 mole solution of the niobium pentachloride be utilized in the thionyl chloride solvent. Further, a sufficient amount of niobium pentachloride should be used to stoichiometrically balance the number of coulombs in the battery due to the amount of lithium utilized as the anode. In niobium pentachloride only the niobium undergoes a valence change from five to three which means that 1 mole of niobium will pick up two coulombs of electrons in its outer orbits. It is this absorbing of electrons under a reverse voltage condition that makes the lithium, thionyl chloride battery safe.

OBJECTS OF THE INVENTION

An object of the present invention is to provide a safe lithium, thionyl chloride battery.

Another object is to provide a safe lithium, thionyl chloride battery when subjected to a reverse voltage condition, such as when the battery is first depleted in a series string of lithium, thionyl chloride batteries.

Another object is to provide an electrolyte for a lithium, thionyl chloride battery which will absorb electrons when the battery is subjected to a reverse voltage condition so that lithium dendrites will not form between the lithium anode and the carbon current collector.

These and other objects of the invention will become more readily apparent from the ensuing specification when taken together with the drawings.

DESCRIPTION OF THE PREFERRED EMBODIMENT

Figure 1:
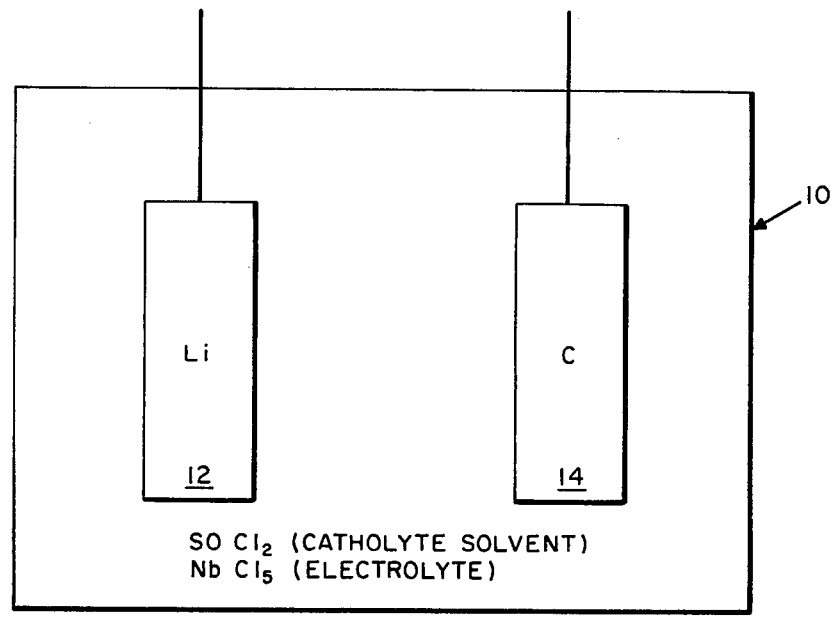
FIGS. 1 and 2 are schematic illustrations of a lithium, thionyl chloride battery with the niobium pentachloride electrolyte utilized to make the battery safe.
Figure 2:
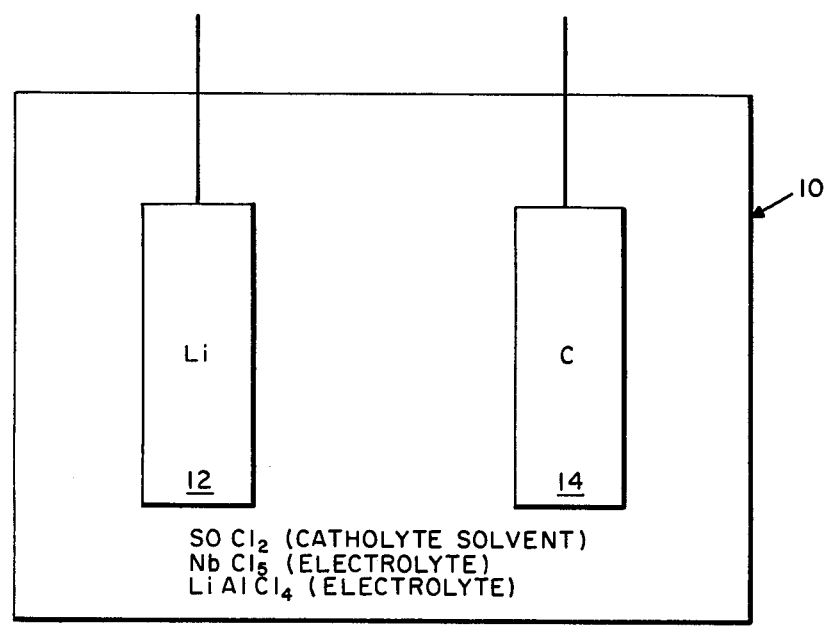

FIGS. 1 and 2 illustrate a lithium, thionyl chloride battery 10 which has a lithium anode 12 and a carbon current collector 14. The anode and current collector are spaced apart in thionyl chloride which serves as a catholyte.

EXAMPLE

A 0.9 mole solution of niobium pentachloride was utilized in the battery as an electrolyte with the thionyl chloride as a solvent. Since the molecular weight of niobium pentachloride is 270.195, it follows that 243.18 grams of niobium pentachloride would be used per liter of thionyl chloride. Further, a sufficient amount of niobium pentachloride must be used to absorb the excess electrons when the battery is subjected to a reverse voltage condition. Only the niobium undergoes a valence change which is from five to three, which means that 1 mole of niobium pentachloride will absorb two coulombs of electrons. The following equation is pertinent:

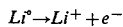

$$Li^\circ \rightarrow Li^+ + e^-$$

Accordingly, when the mass of lithium is known in the battery, the amount of niobium pentachloride can be calculated. For every seven grams of lithium there is required 140 grams of niobium pentachloride.

In the most practical situation the amount of niobium pentachloride in a battery will stoichiometrically balance the coulomb capacity of the battery. When such a battery is connected in series with one or more lithium, thionyl chloride batteries of the same capacity, there will be no danger of the battery under observation of exploding under a reverse voltage condition. Assuming that the battery under observation was inadvertently connected in series when it had only half the strength capacity of the other batteries, the battery under observation would be used up and subjected to a reverse voltage condition when the other batteries were at their half strengths. The battery under observation would then continue under a reverse voltage condition until the other batteries used up their remaining half strengths. During this period the niobium pentachloride in the battery under observation would be soaking up the excess electrons due to the discharging of the other batteries. Now, further assuming that the battery under observation was completely dead when connected in series with the batteries which are fully charged, the battery under observation will still not explode providing the battery under observation had the original capacity that the other batteries in the string had. Accordingly, the safest construction is to use sufficient niobium pentachloride to satisfy the lithium capacity of the battery so that when the battery is put in series with other batteries of the same strength, the battery under observation will not explode even though it inadvertently had a lesser capacity when the series connection was made.

By placing niobium pentachloride as an electrolyte in a lithium, thionyl chloride battery dendrites of lithium are prevented from forming between the lithium anode and the cathode current collector. When these dendrites bridge between the anode and the current collector, they will flash due to the shorted condition of the battery and the battery will explode in an incendiary fashion when there is any elemental sulfur in the cell. Elemental sulfur is a normal by-product of the reaction of the cell. The following equation is pertinent in this regard:

$$2SOCL_2 + 4Li \rightarrow 4LiCl + SO_2 + S$$

The battery described in the example above delivered 1.5 to 1.7 volts at a 5 milliamp load. Such an embodiment would have importance for low rate applications, such as heart pacemakers, fire alarms, watches and calculators.

If niobium pentachloride is the sole electrolyte in the battery, the battery is inherently capable of only low rate application. If higher rate batteries are desired, it is believed that the niobium pentachloride can be used in conjunction with an electrolyte of lithium tetrachloraluminate. The lithium tetrachloraluminate gives a higher electrolyte conductivity than niobium pentachloride. In such an embodiment it is still necessary that a sufficient amount of niobium pentachloride be utilized to soak up the expected excess electrons that will be thrusted through the cell under a reverse voltage condition.

OPERATION OF THE INVENTION

All batteries in a series string of lithium, thionyl chloride batteries of the same capacity should have sufficient niobium pentachloride for one battery life. With this arrangement should any battery in the string be hooked up originally with a lesser capacity, the niobium pentachloride in the battery first depleted will soak up the excess electrons from the other batteries until they are also completely dead. Further, with such an arrangement even though the battery under observation was completely dead it would still be protected until all of the other batteries had also gone completely dead.

Obviously, many other modifications and variations of the present invention are possible in the light of the above teachings, and, it is therefore understood that within the scope of the disclosed inventive concept, the invention may be practiced otherwise than as specifically described.

What is claimed is:

1. In a battery having a lithium anode, carbon cathode collector, thionyl chloride catholyte, and an electrolyte dissolved in the thionyl chloride, the improvement comprising:
the electrolyte including niobium pentachloride dissolved in the thionyl chloride.

2. A combination as claimed in claim 1 including:
the amount of niobium pentachloride being sufficient to absorb the number of electrons released by the lithium in the battery under a load until the battery is completely dead.

3. A combination as claimed in claim 2 including:
the niobium pentachloride and the thionyl chloride being a 0.9 mole solution.

4. A combination as claimed in claim 3 including:
the amount of niobium pentachloride being sufficient to absorb the number of electrons released by the lithium in the battery under a load until the battery is completely dead.

5. A combination as claimed in claim 1 wherein the electrolyte consists essentially of:
niobium pentachloride.

6. A combination as claimed in claim 1 including:
the electrolyte being niobium pentachloride and lithium tetrachloraluminate.

* * * * *